US009129201B2

(12) United States Patent
Mazoki et al.

(10) Patent No.: US 9,129,201 B2
(45) Date of Patent: Sep. 8, 2015

(54) TECHNOLOGY ENHANCEMENT CLIP FOR HARD TAGS (71) Applicant: Checkpoint Systems, Inc., Thorofare, NJ (US)

(72) Inventors: Gary T. Mazoki, Sewell, NJ (US); Thomas J. McKeown, Pennsauken, NJ (US); Morui Li, West Deptford, NJ (US); Wei Wu, Shanghai (CN)

(73) Assignee: Checkpoint Systems, Inc., Thorofare, NJ (US)

( * ) Notice: Subject to any disclaimer, the term of this patent is extended or adjusted under 35 U.S.C. 154(b) by 249 days.

(21) Appl. No.: 13/740,715

(22) Filed: Jan. 14, 2013

(65) Prior Publication Data
US 2013/0199026 A1 Aug. 8, 2013

Related U.S. Application Data (60) Provisional application No. 61/594,487, filed on Feb. 3, 2012.

(51) Int. Cl.
*H01Q 17/00* (2006.01)
*G06K 19/077* (2006.01)
*E05B 73/00* (2006.01)
*G08B 13/24* (2006.01)

(52) U.S. Cl.
CPC ...... *G06K 19/07758* (2013.01); *E05B 73/0017* (2013.01); *G08B 13/2434* (2013.01); *Y10T 29/49002* (2015.01); *Y10T 29/49018* (2015.01)

(58) Field of Classification Search
CPC .............. E05B 73/0017; H01Q 9/065; G08B 13/2434; G08B 13/2448; G08B 13/246; G08B 13/248; G06K 19/07758
USPC ........................ 29/601, 592.1, 600, 825, 831; 340/568.1, 572.1, 572.8, 572.9
See application file for complete search history.

(56) References Cited

U.S. PATENT DOCUMENTS

| 6,339,378 | B2 | 1/2002 | Seidel |
| 7,148,805 | B2 * | 12/2006 | Hogan ........................ 340/572.9 |
| 7,633,396 | B2 | 12/2009 | Lynce et al. |
| 7,652,574 | B2 | 1/2010 | Sayegh |
| 7,961,100 | B2 | 6/2011 | Wyatt, Jr. et al. |
| 2005/0030182 | A1 | 2/2005 | Hogan |
| 2009/0121880 | A1 | 5/2009 | Joyce, Jr. et al. |
| 2010/0315238 | A1 | 12/2010 | Yang |
| 2012/0001814 | A1 | 1/2012 | Copeland et al. |

* cited by examiner

Primary Examiner — Thiem Phan (57) ABSTRACT

A technology clip and method for supplementing a security tag with the technology clip for application to a product. The technology clip includes a technology element providing for an additional security and/or an identification feature when coupled to a tag, thus enhancing features of the security tag. The technology clip attaches about the tag and remains secured to the tag for when the tag is affixed to merchandise.

18 Claims, 7 Drawing Sheets

TECHNOLOGY ENHANCEMENT CLIP FOR HARD TAGS

CROSS-REFERENCE TO RELATED APPLICATION

This application claims the benefit under 35 U.S.C. §119 (e) of the earlier tiling date of U.S. Provisional Application Ser. No. 61/594,487 filed on Feb. 3, 2012, the entire disclosure of which is hereby incorporated by reference herein as if being set forth in its entirety.

BACKGROUND

The present disclosure relates to a technology clip device and method for supplementing a security hard tag with the technology clip. The technology clip enhances and attaches to a security hard tag. The technology clip includes a technology element providing an additional feature when coupled to a security hard tag for application to products.

Electronic article surveillance (EAS) includes the tracking and/or detecting the presence or removal of items from warehousing, inventory, or a retail establishment. EAS is achieved by applying an EAS element as part of a security tag to the item or it packaging and when the security tags are exposed to a predetermined electromagnetic field (e.g. pedestals located at a retail establishment exit), they activate to provide some type of alert and/or supply data to a receiver or other detector. In the electronic article surveillance (EAS) industry, a "hard tag" refers to either a re-usable or disposable tag which is intended to be removed from an article, e.g., merchandise at the point of sale to be re-used on other merchandise or thrown away. Hard tags typically are constructed to contain an EAS element, winch may be for example an acousto-magnetic element (AM), a radio frequency element (RF), or electro-magnetic element (EM). Tags may also be constructed to contain a radio frequency identification (RFID) element, which may respond at low, high, or ultra high frequencies.

An EAS element may include a resonant circuit with a coil coupled to a capacitor. The EAS security element is tuned to a predetermined frequency and if one attempts to remove the hard tag with the security element from a store, an alarm triggers as the tag passes through as surveillance field created by a transmitter and receiver located between pedestals at the store exit, tuned to the same frequency. The alarm goes off as the EAS element resonates, providing an output signal detected by a receiver, also located in the pedestals.

An RFID element typically includes an integrated circuit (IC) and an RF LC circuit (resonant circuit) or antenna (e.g. as dipole antenna), tuned to a predetermined RF frequency. Often, the integrated circuit (IC) comprises memory that has been programmed with information associated with the article (e.g., product ID information such as a serial number, unique identification number, price, etc.). When a transmitter emits a signal at the predetermined RE frequency and threshold value which is received by the tuned antenna, the RFID element emits a signal containing the stored information which is then received by a receiver and the information demodulated from the element-emitted signal. This information can then be used for, among other things, determining whether to set off an a alarm or not. The RFID tag may also be used for merchandise visibility and inventory control, to identify where a tag and associated product are located or where they have moved to or from within the store.

In alternative to an EAS element embedded in as hard tag, the hard tag may be equipped with a benefit denial device. A benefit denial tag typically includes ink releasing elements, such that when an attempt to break the tag from a product is performed, glass vials of ink shatter within the tag, ultimately leaking about the product which devalues the product and likewise to provide notification to the retailer that that particular merchandise was tampered with.

Retail stores typically utilize only one of the above security technologies in a hard tag for application to products. Adding two or more tags to a product, wherein each tag may have as different functional element (e.g. RFID or EAS, or ink) is advantageous from a security and/or inventory perspective. For example, a hard tag attached to product containing an EAS tag may notify the retailer if merchandise has been stolen when transferred through a pedestal and an RFID tag attached to the same product may inform a retailer through a reader of where the particular product is located throughout a store. However, application of multiple tags to a product requires significant time and resources to outfit a product with multiple tags at multiple locations about the product. If retail personnel are required to outfit the products with multiple tags, then the customer and potential sales may be impacted. Less retail personnel may be on the store floor to aid customers if they are in the backroom of the store having to apply multiple tags to a product. Customer wait at a checkout may also lengthen, as the retailer has to find and then detach, deactivate, and remove more than one tag from the product.

What is needed is a device and method to combine additional elements about a single hard tag and maintain the method and effort for attachment to garments and likewise the removal method and effort of the device at the point of sale. With multiple elements combined about one hard tag, additional security and/or merchandise visibility and inventory may occur. A hard tag, having additional elements about the tag, means that only one tag may be applied about a product as opposed to many tags, each having different security functions and/or merchandise visibility functions.

SUMMARY

Embodiments of this disclosure provide an apparatus and method to attach to as security tag. The apparatus may be a technology clip which provides an additional feature to the tag. The technology clip attaches about the tag and is secured to the tag for when the tag is attached to merchandise.

Embodiments of this disclosure are directed to an apparatus for a security tag. The apparatus includes a shell including one or more connectors and a hollow. The one or more connectors are configured to attach the apparatus to the security tag and the hollow is configured to provide an accessway for a security tag locking pin to lock into the security tag to secure merchandise between the security tag and a head of the locking pin. The apparatus further includes at least one technology element to provide enhancement to the security tag. The at least one technology element is located within or about the shell.

According to one embodiment, the at least one technology element is selected from one of an acousto-magnetic element, a radio frequency element, an electro-magnetic element, a radio frequency identification element, or a benefit denial element.

According to another embodiment, the shell further includes an internal ceiling extending from around the hollow to a periphery wall of the shell. The periphery wall extends transverse from the surface of the internal ceiling along the periphery of the apparatus. The internal ceiling is opposite an outer surface of the shell.

According to one aspect of one embodiment, the internal ceiling is concealed when the apparatus is attached to the security tag. According to one aspect of one embodiment, the at least one technology element is located on the internal ceiling. According to one aspect of one embodiment, the at least one technology element is adhered to the internal ceiling. According to one aspect of one embodiment, the at least one technology element is located around the hollow.

According to another embodiment, the at least one technology element is a radio frequency identification element. The radio frequency identification element is funned as a radio frequency identification inlay including an antenna electrically connected to a radio frequency identification chip. The antenna comprises to dipole and a loop connected by a neck. The dipole, loop, and neck are optimized to match impedance of the radio frequency identification chip.

According to one aspect of one embodiment, the loop and the dipole are designed with curvatures to form the antenna around the hollow and to fit the antenna within the periphery wall and about the internal ceiling.

According to another embodiment, the diameter of the hollow is large enough to allow for a portion of the security tag to pass through the accessway of the hollow before the locking pin locks into the security tag.

According to one aspect of one embodiment, the portion of the security tag passing through the accessway includes a security tag embankment rising from as security tag housing and in a generally transverse direction from the diameter of the security tag between the circumference of the security tag as surrounded by a security tag periphery wall. The security tag is generally round. The portion of the security tag further includes a security tag plateau. The security tag embankment rises to and surrounds the circumference of the security tag plateau. The portion of the security tag further includes a plunger cavity located central on the security tag plateau. The locking pin enters the plunger cavity to lock the locking pin into the security tag.

According to another embodiment, the one or more connectors are located about the periphery wall and connect about the security tag periphery wall when the apparatus is attached to the security tag.

According to another embodiment, the diameter of the hollow is smaller than the diameter of a locking pin head of the locking pin so that when the locking pin is locked into the security tag the technology clip is pinned between the locking pin head and the security tag. The locking pin head is located on the opposite end of the locking pin that is locked into the security tag.

Embodiments of this disclosure are directed to a method for supplementing a security tag, with an apparatus. The method includes attaching the apparatus to the security tag by one or more connectors located on a shell of the apparatus. The method also includes providing an accessway through a hollow in the shell. The method also includes securing an article of merchandise about the security tag by inserting a security tag locking pin through the article of merchandise and locking the locking pin into the security tag through the accessway. The method also includes enhancing the security tag by at least one technology element located within or about the shell.

According to one embodiment, the method also includes adhering the at least one technology element on an internal ceiling of the shell and around the hollow. When attaching the apparatus to the security tag, the method also includes concealing the internal ceiling. The internal ceiling extends from around the hollow to a periphery wall of the shell. The periphery wall extends transverse from the surface of the internal ceiling along the periphery of the apparatus. The internal ceiling is opposite an outer surface of the shell.

According to another embodiment, the method also includes forming a radio frequency identification inlay for the technology element by electrically connecting an antenna to a radio frequency identification chip. The antenna is formed by a dipole and a loop connected at a neck. The method also includes optimizing the dipole, loop, and neck to match the impedance of the radio frequency identification chip. The method also includes designing the loop and dipole with curvatures to form around the hollow and to fit the antenna within the periphery wall and about the internal ceiling.

According to another embodiment, the method also includes positioning a portion of the security tag through the accessway of the hollow before locking the locking pin into the security tag. According to one aspect of one embodiment, the diameter of the hollow is large enough to allow for a portion of the security tag to pass through the accessway. The portion of the security tag includes as security tag embankment rising from as security tag housing and in a generally transverse direction from the diameter of the security tag between the circumference of the security tag as surrounded by a security tag periphery wall. The security tag is generally round. The portion of the security tag also includes a security tag plateau. The security tag embankment rises to and surrounds the circumference of the security tag plateau. The portion of the security tag also includes a plunger cavity located central on the security tag plateau. The locking pin enters the plunger cavity to lock the locking pin into the security tag.

According to another embodiment, the method also includes positioning the article of merchandise between the apparatus and security tag before inserting the locking pin through the article of merchandise and before locking the locking pin into the security tag.

According to another embodiment, the method also includes positioning the article of merchandise over the outer surface of the shell before inserting the locking pin through the article of merchandise and before locking the locking pin into the security tag to secure the article of merchandise between a locking pin head of the locking pin and the shell. The locking pin head is located on the opposite end of the locking pin that is locked into the security tag.

According to another embodiment, the method also includes removing the apparatus from the security tag and replacing the apparatus with a second apparatus, wherein the second apparatus comprises a technology element which is similar or different to the technology element of the removed apparatus.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of this disclosure are best understood from the following detailed description when read in connection with the accompanying drawings. For the purpose of illustrating this disclosure, there is shown in the drawings embodiments that are presently preferred, it being understood, however, that this disclosure is not limited to the specific instrumentalities disclosed. Included in the drawings are the following Figures.

DETAILED DESCRIPTION OF ILLUSTRATIVE EMBODIMENTS

This document describes a technology clip and method for supplementing, the security hard tag with the technology clip. The technology clip is an apparatus that provides an additional feature to work in conjunction with the features present in the security tag, thus enhancing features of the tag. The technology clip attaches about the tag and is secured to the hard tag for when the tag is to be attached to merchandise.

Figure 1:
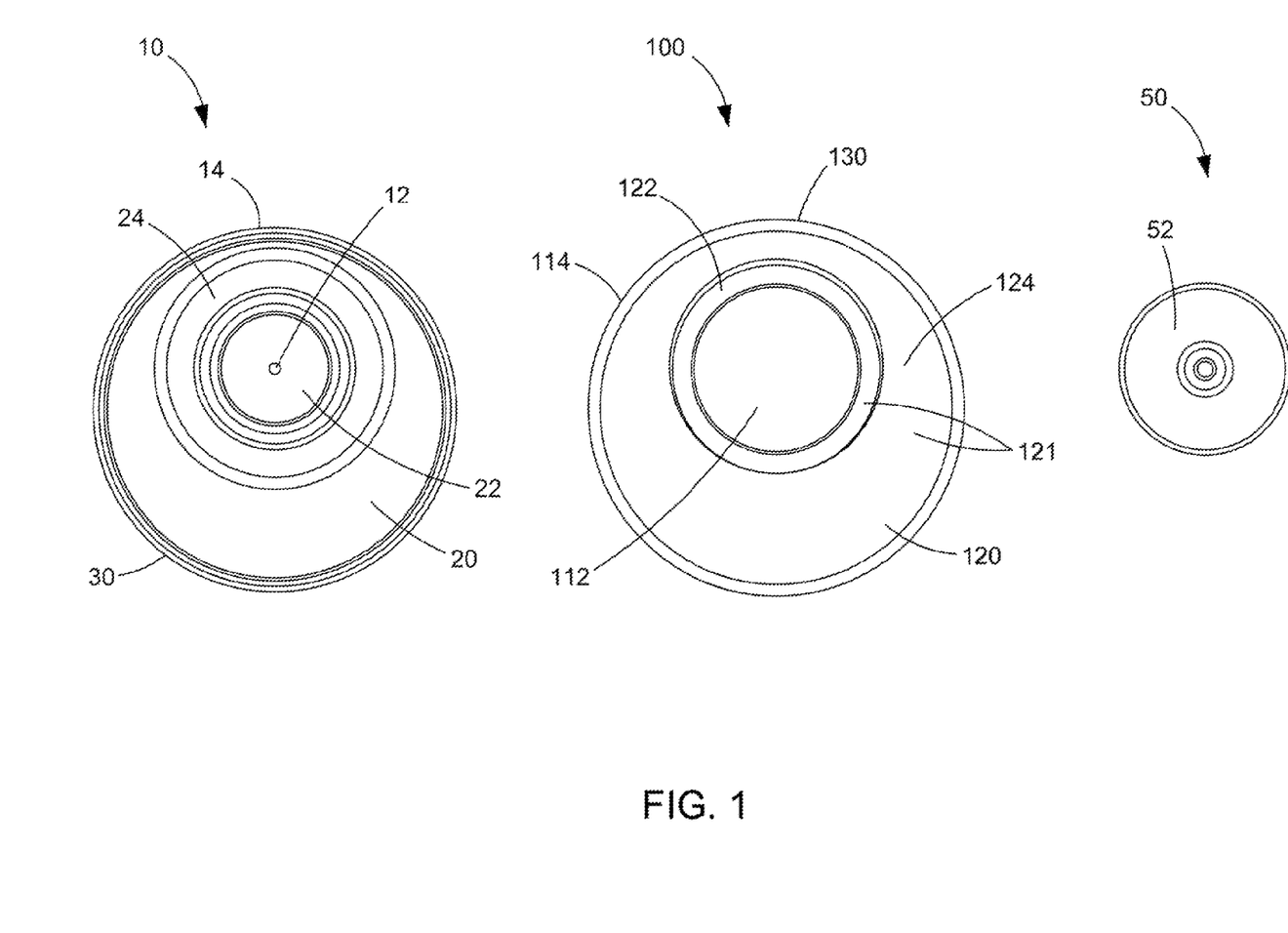
FIG. 1 illustrates a top-down view of the security hard tag, technology clip, and locking pin according to one embodiment.

FIG. 1 illustrates a top-down view of the security hard tag, technology clip, and locking pin. The security hard tag 10, which may herein be referred to as security tag, hard tag, or tag, and as shown in FIG. 1, may enclose one or more various types of elements within the security tag housing 20. The term "hard" is not necessarily indicative of the firmness, composition, or density of the security tag housing 20. A "hard tag" refers to either re-usable or disposable tags intended to be removed from an article of merchandise, of which may contain a technology element within. The security tag housing 20, as for example, may be constructed with hard or soft plastic, rubber, glass, metal, etc. In the preferred embodiment, the security to 10 is generally round, but may be other sizes and/or shapes. The security tag 10 shown in FIG. 1 may contain either an acousto-magnetic element (AM), a radio frequency element (RF), or an electro-magnetic element (EM). In alternative, the security tag 10 shown in FIG. 1 may contain a radio frequency identification (RFID) element within the security tag housing 20. In alternative, the security tag 14) shown in FIG. 1 may contain a benefit denial device, such as an ink releasing element. In the preferred embodiment, shown in FIG. 1, the security tag 10 includes a RF element, comprising an LC circuit which includes inductor coil and capacitor components (not shown). The RF element in the security tag is an inductor/capacitor (LC) circuit that may alarm at a detector as the detector sweeps for the resonant frequency of the security tag 10. The resonance peak of the LC circuit may be anywhere between 1.75 MHz to 9.5 MHz, wherein 8.2 MHz is the more popular frequency in the industry.

Figure 5:
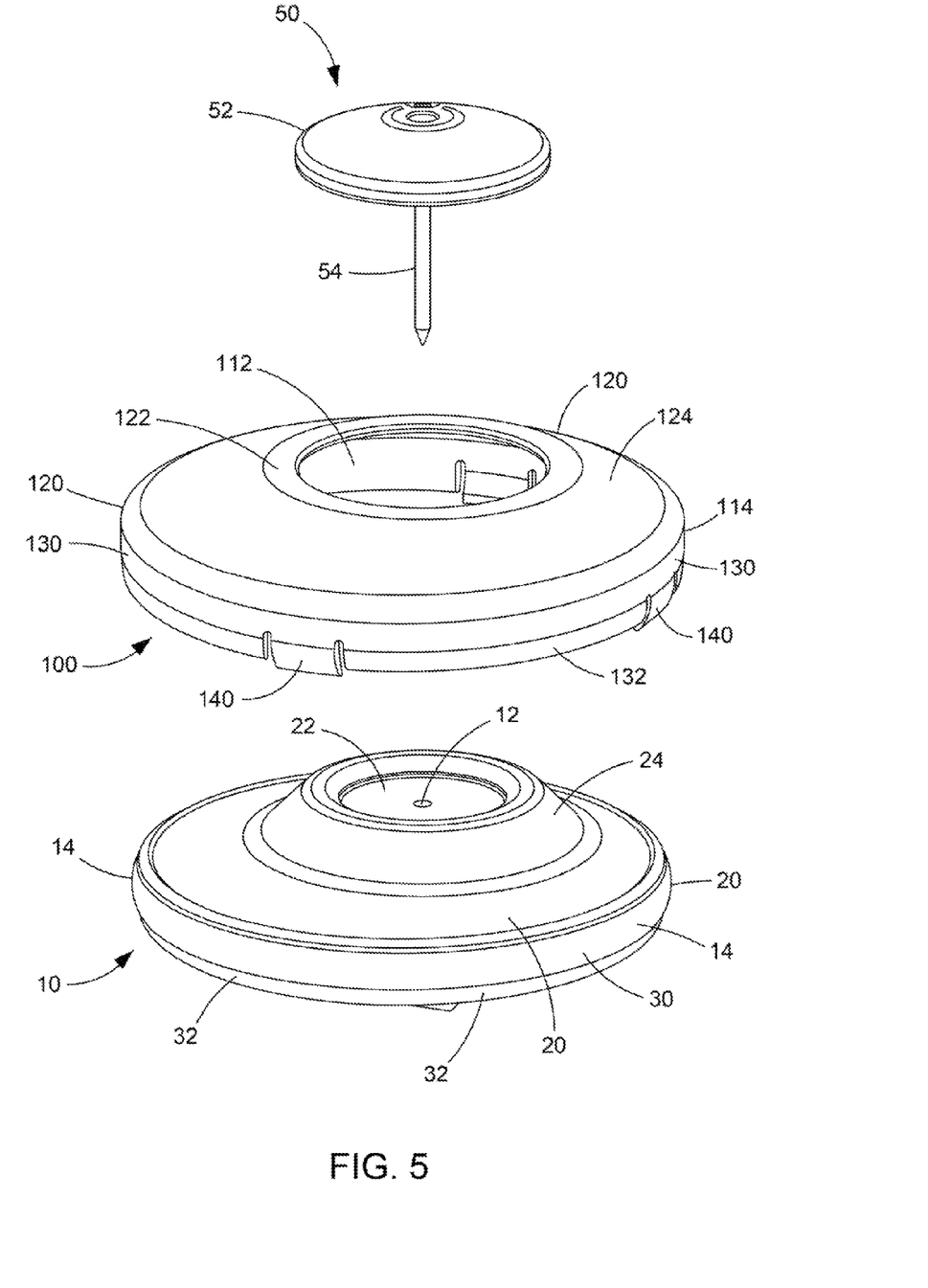
FIG. 5 illustrates the locking pin aligned over the technology clip which is aligned over the security hard tag according to one embodiment.

In the preferred embodiment, the security hard tag 10 also features a ball clutch locking device, herein simply referred to as lock component 40 (see FIGS. 6 and 7), which is known in the industry. Lock component 40 may include a spring, compressing chamber, and balls, of which a pin 54 (see FIG. 5) of the security tag locking pin 50 may be applied into the security hard tag 10, with a garment or portion of the merchandise enclosed between the locking pin head 52 and security hard tag 10. Locking pin 50 includes the locking pin head 52 at one end of as pin 54 extending from connection with the lock pin head 52, as shown in FIG. 5. The spring, compressing chamber, and balls are located in the lock component 40 (see FIGS. 6 and 7) and lock the locking pin 50 about the security hard tag 10 when the pin 54 (see FIG. 5) is aligned and inserted into the plunger cavity 12 of the security hard tag 10. In other embodiments, the lock component 40 may be integrated with an alarming device (not shown) in the tag 19 and the locking pin 50 may be configured to electrically connect about the lock component 40 and thus the alarming device, of which is more particularly described in U.S. Pat. No. 7,961,100 and of which is hereby incorporated by reference and assigned to Checkpoint Systems, Inc.

In the preferred embodiment, technology clip 100, as shown in FIG. 1, may contain as technology element not shown) within or about the technology clip shell 120 of the technology clip 100. When the technology clip 100 is attached about the security hard tag 10, the technology element in or about the technology clip 100 supplements the same or different technology/security element located in the tag housing 20 of the security hard tag 10. Thus, the technology clip 100 is an enhancement to improve the functionality of the security hard tag 10. In the preferred embodiment, the technology element located in the technology clip 100 is a RFID inventory identifier element, shown as RFID inlay 200 (see FIG. 3) designed for ultra high frequencies (UHF). In other embodiments, the technology clip 100 may contain a RFID element for low frequency elements (LF) or high frequency elements (HF), or may contain acousto-magnetic elements (AM), radio frequency elements (RF), electro-magnetic elements (EM), or benefit denial type security elements. For example, in place of a dipole UHF antenna (see FIG. 4), an HF element would include an inductive coil looping, connected to the RFID chip 202, wherein the number and shape of loops in the inductive coil looping would be optimized to match the capacitance of the RFID chip so as to attain, for example, a popular frequency of 13.56 MHz.

Figure 2:
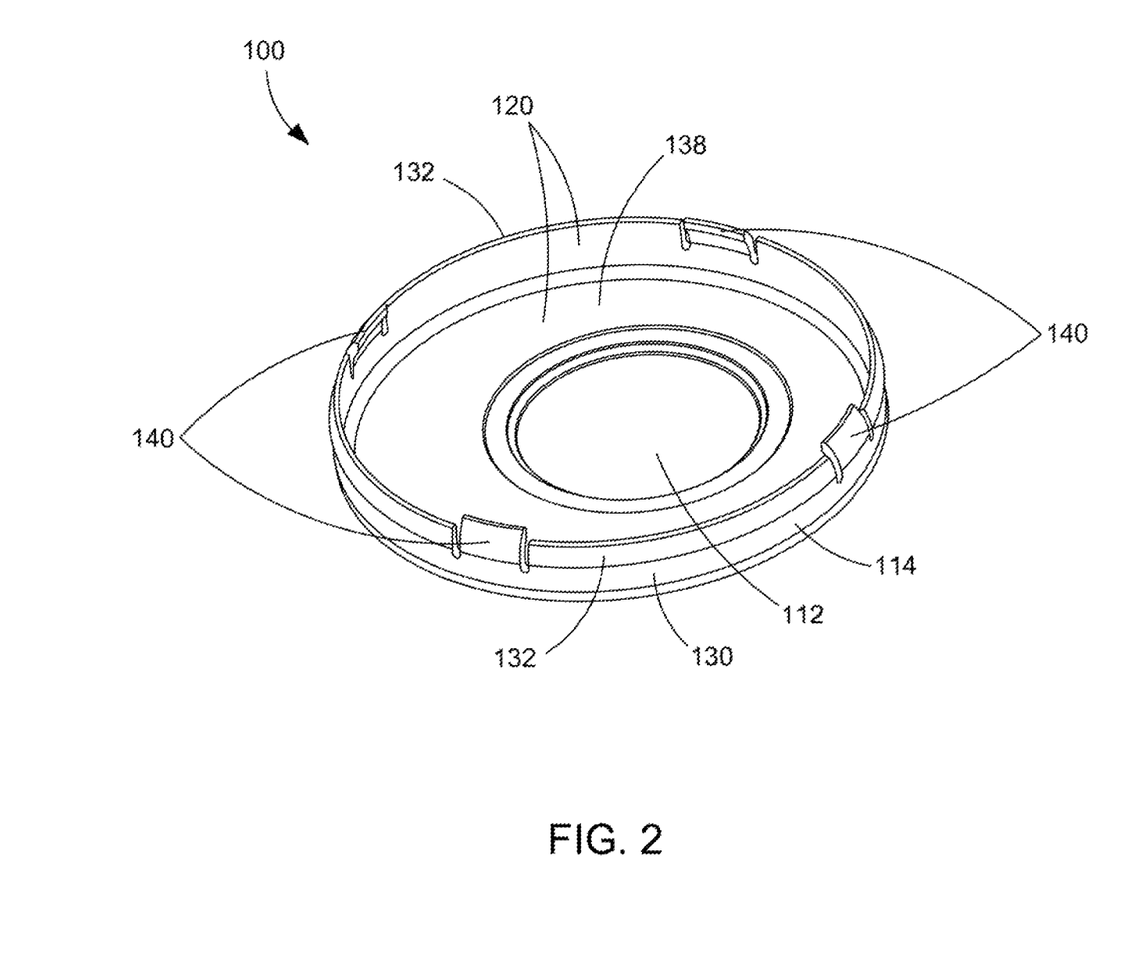
FIG. 2 illustrates a reverse perspective view of the technology clip shell of the technology clip of FIG. 1 according to one embodiment.

FIG. 2 illustrates a reverse perspective view of the technology clip shell 120 of the technology clip 100 of FIG. 1. The shell 120 includes a technology clip internal ceiling 138 connected to a technology clip periphery wall 130 extending transverse from the surface of internal ceiling 138 along the technology clip periphery 114. The internal ceiling 138 is shown as generally flat, but in other embodiments the internal ceiling 138 may be sloped. A technology clip hollow 112, or opening, exists in the surface of the technology clip shell 120 through the internal ceiling 138. The technology clip hollow 112 provides an accessway for the locking pin 50 to lock with the security hard tag 10. On the opposite edge of the technology clip periphery wall 130, away from the edge connected about the internal ceiling 138, is the technology clip periphery lower wall 132. Four connectors 140 are located along the technology clip periphery lower wall 132. The connectors 140 are one example of as means to attach the technology clip 100 to the security hard tag 10. In other embodiments, one or more connectors 140 may be located along the technology clip periphery lower wall 132.

Figure 3:
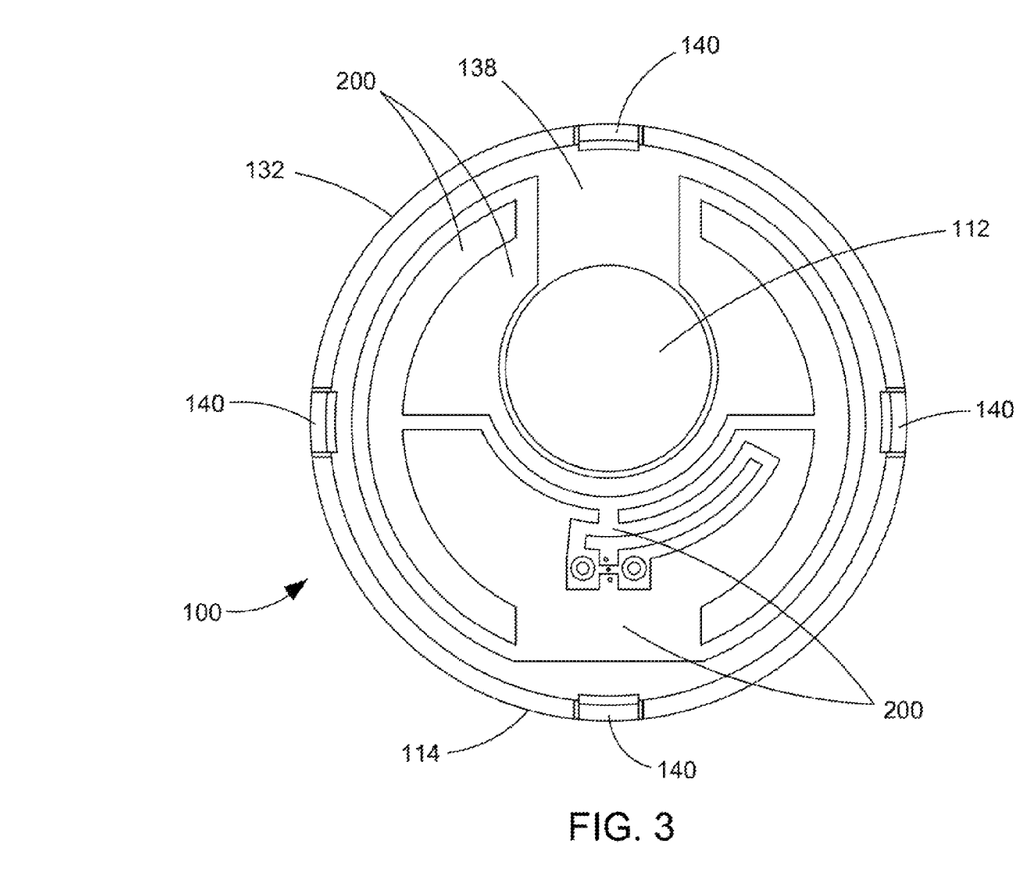
FIG. 3 illustrates a reverse top-down view of the technology clip of FIG. 1 with RFID inlay/element shown within according to one embodiment.
Figure 6:
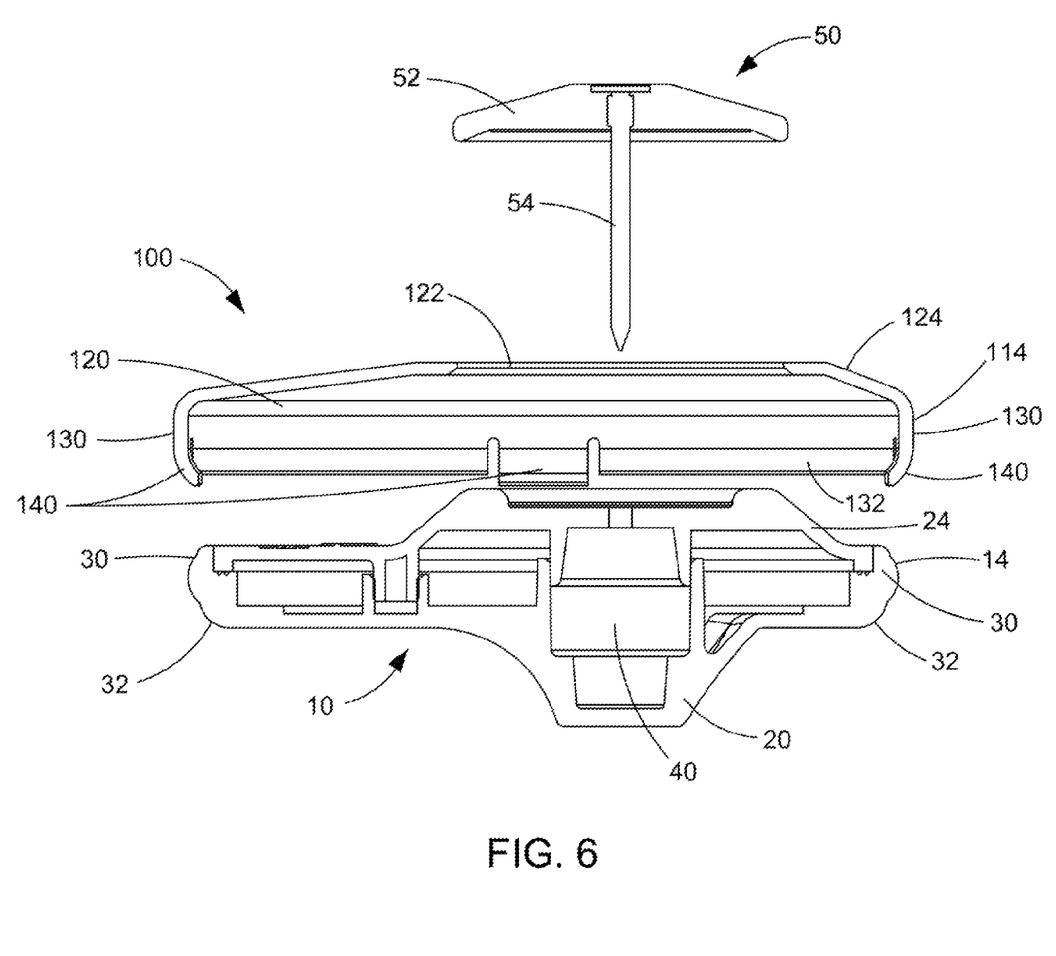
FIG. 6 illustrates a cross-sectional side view of the locking pin and security hard tag and a side view of the technology clip as shown in alignment in FIG. 5 according to one embodiment.

On the opposite side to the internal ceiling 138 is the technology clip housing outer surface 121 (see FIG. 1) wherein a portion is sloped forming a technology clip embankment 124 (see FIG. 1 and FIG. 6). At about the hollow 112, the technology clip embankment 124 flattens to form technology clip lip 122 located around the circumference of the technology clip hollow 112 (see FIG. 1). In other embodiments, the technology clip housing outer surface 121 may be generally flat without slope or may have various degrees of slope. A technology element, such as RFID inlay 200 (see FIG. 3), may be located on the surface of the technology clip internal ceiling 138, as shown in FIG. 3. In other embodiments, the technology element may be located in a portion of the ceiling 138, or along the periphery wall 130, or exposed on the technology clip housing outer surface 121, such as at the technology clip embankment 124 or technology clip lip 122 or anywhere else about the shell 120. In other embodiments, more than one technology element may be located on or about the technology clip 100. In other embodiments, the technology element may be concealed about the technology clip 100, in for example, a pocket or behind shielding so that the security element may not be viewed from outside the technology clip 100. In the preferred embodiment, when the technology clip 100 is attached to the security hard tag 10, the internal ceiling 138 and thus any technology element located on or about the ceiling 138 is concealed.

FIG. 3 illustrates a reverse top-down view of the technology clip 100 of FIG. 1 with RFID inlay/element shown within. The RFID element located in the technology clip 100 is formed as a RFID inlay 200 positioned on the surface of the technology clip internal ceiling 138, as shown in FIG. 3. Adhesive may be applied to secure the RFID inlay 200 on the internal ceiling 138. Adhesive may be used to secure any technology element on or about the technology clip 100.

Figure 4:
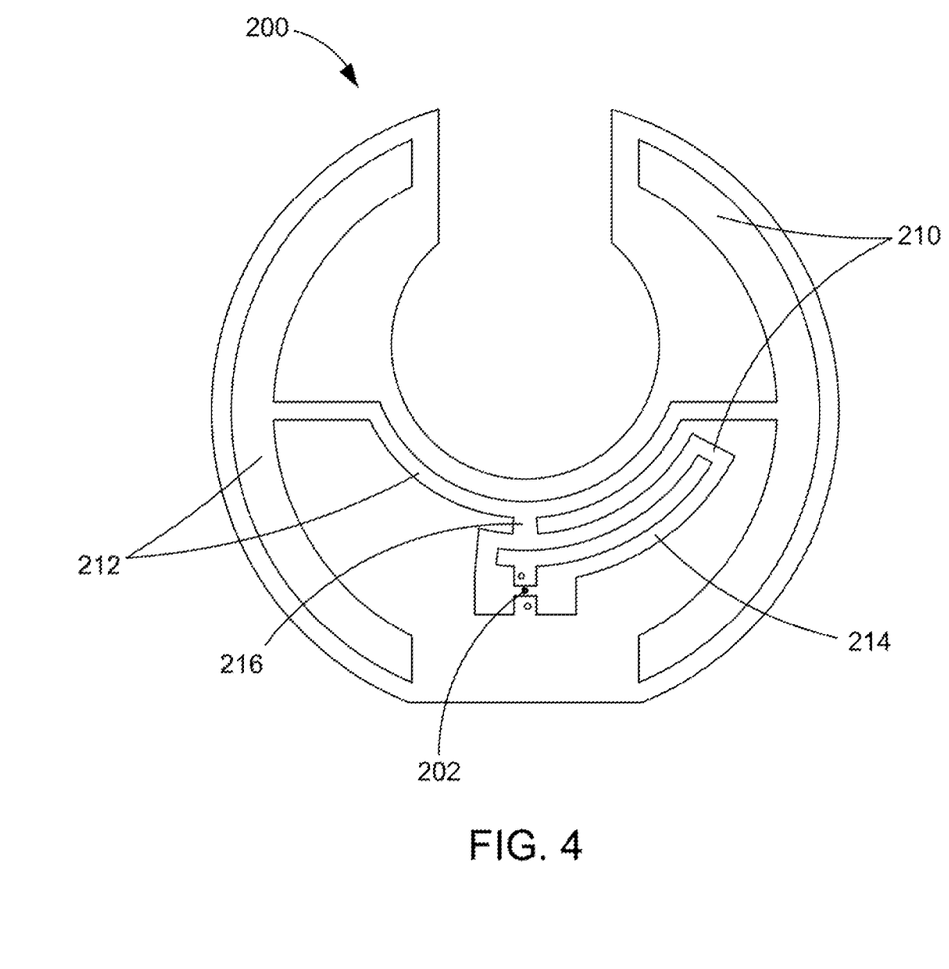
FIG. 4 illustrates an isolated view of the RFID inlay/element of FIG. 3 according to one embodiment.

FIG. 4 illustrates an isolated view of the RFID inlay/element of FIG. 3. In the preferred embodiment, the RFID inlay 200 is designed to conform around the technology clip hollow 112 (see FIG. 3). In the preferred embodiment, the RFID inlay 200 is designed for UHF. The RFID inlay 200 may include an antenna 210 electrically connected to as RFID chip 202. The RFID chip may be constructed with silicon. The antenna 210 may include a dipole 212 and loop 214. The loop 214 and dipole 212 may be connected by a neck 216. The antenna 210 may be designed to fit within the technology clip periphery wall 130 and over the surface of the internal ceiling 138, without exposure across the hollow 112. The dipole 212, loop 214, and loop connection to the dipole 212 about the neck 216 may be optimized to match the impedance of the READ chip 202. The loop 214 and the dipole 212 may also be optimized in consideration of inductive coupling with a RF element, comprising an inductor coil/LC circuit, as located in the security hard tag 10 (not shown in the preferred embodiment. This allows for the RFID tag antenna to operate within the window of 840 to 940 MHz. In other embodiments, other types of technology elements in the technology clip 100 may be optimized to work in conjunction with the various types of technology elements in the hard tag 10, as for example with inductive coupling. As shown in FIGS. 3 and 4, the loop 214 and dipole 212 are designed with curvatures to position the antenna 210 around the hollow 112 and to fit within the technology clip periphery wall 130 about the technology clip internal ceiling 138. The antenna 210 also collects carrier wave (CW) energy transmitted from an RFID reader. The antenna 210 then delivers the energy to the RFID chip 202, where the RFID chip 202 processes commands from the reader, as encoded in the CW. A reply is sent from the RFID chip 202 to the antenna 210 by way of backscattering from the antenna 210.

The technology clip 100 is designed so as to securely attach about the security tag 10 while the security tag 10 is affixed to merchandise. In the preferred embodiment, the RFID element in the technology clip 100 may provide additional functionality to the RIF element (not shown) in the security hard tag 10.

FIG. 5 illustrates the locking pin 50 aligned over the technology clip 100, which is aligned over the security tag 10. FIG. 6 illustrates a cross-sectional side view of the locking pin 50 and security tag 10, and a side view of the technology clip 100, as shown in alignment in FIG. 5. The technology clip 100 may be attached to the tag 10 before the pin 54 of the locking pin 50 is inserted into the plunger cavity 12 of the tag 10 to lock the security tag 10 about merchandise, in the preferred embodiment, the technology clip 100 is placed over the tag 10, as shown in alignment in FIG. 5. The pin 54 is inserted through the merchandise after the technology clip 100 is attached to the security hard tag 10. In other embodiments, the pin 54 may be inserted through the merchandise before the technology clip 100 is attached to the security hard tag 10.

Figure 7:
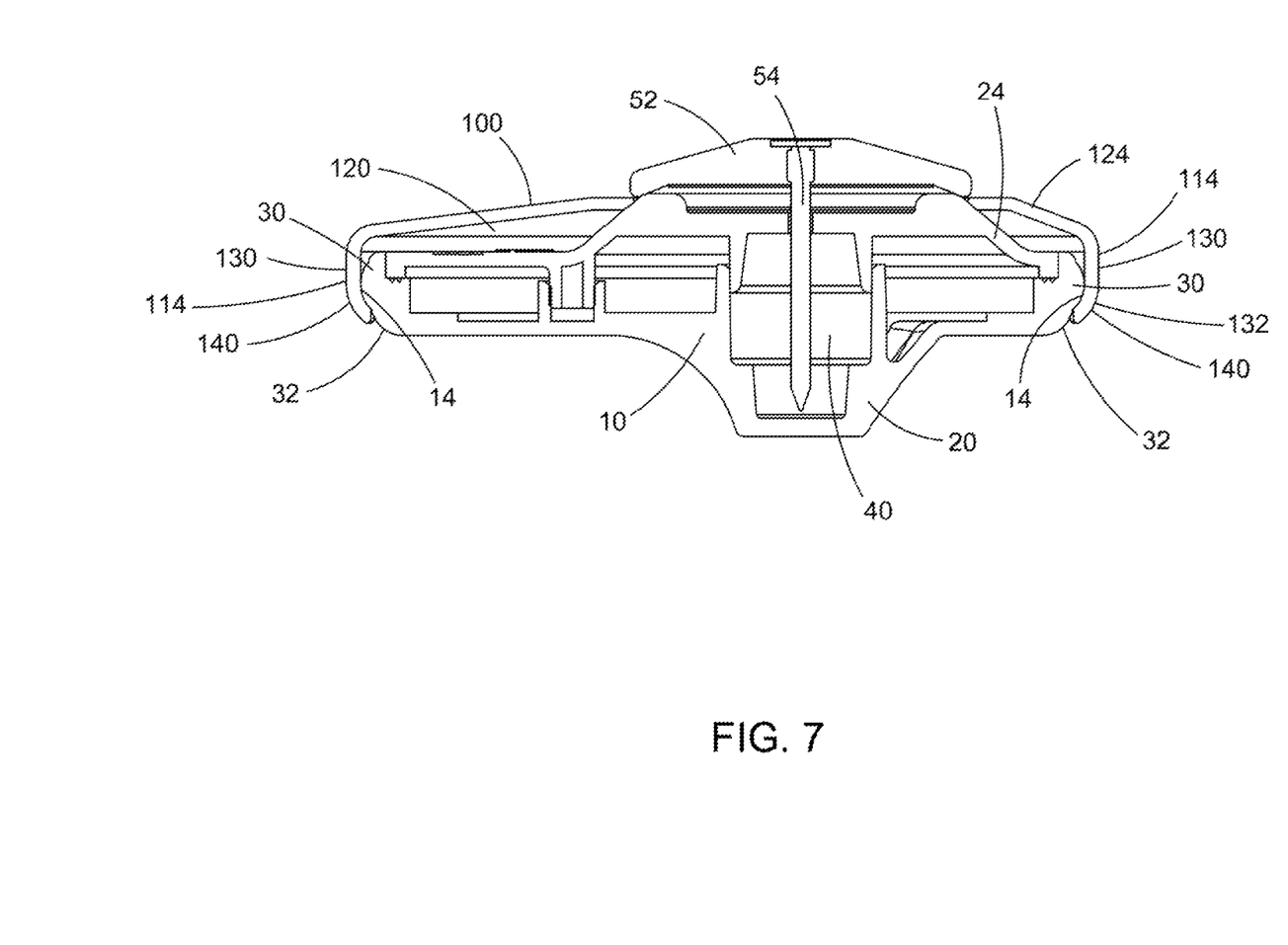
FIG. 7 illustrates a cross-sectional side view of the technology clip attached to the security hard tag and the locking pin inserted into the security hard tag, as through the technology clip according to one embodiment.

FIG. 7 illustrates a cross-sectional side view of the technology clip 100 attached to the security tag 10 and the locking pin 50 inserted into the security tag 10, as through the technology clip 100. The security tag periphery wall 30 forms along the security tag periphery 14 about the circumference of the security tag 10 as part of the security tag housing 20. The security tag periphery wall 30 fits within the technology clip periphery wall 130 when the technology clip 100 is placed down on the security tag 10. The technology clip periphery wall 130 may flex and extend over and down upon the tag 10, surrounding the security tag periphery wall 30 about the security tag periphery 14. The technology clip periphery lower wall 132 extends over the security tag periphery wall 30 at about the connection of the security tag periphery wall 30 with the security tag lower periphery wall 32. As shown in FIG. 5 and FIG. 6, the security tag periphery wall 30 extends outwardly along the security tag periphery 14 as approximately perpendicular to pin 54 further than the security tag lower periphery wall 32, connected below the security tag periphery wall 30, and all part of the tag housing 20. Referring again to FIG. 7, the clip attachment 140 of the technology clip 100 flexes out to retain the security tag periphery wall 30, extending outwardly further than the security to lower periphery wall 30 about the circumference of the security tag 10, and to keep the top side of the tag 10 within the technology clip shell 120. The technology clip shell 120 is shown in FIG. 6, so as to show three of the four connectors 140. The connectors 140 may simply flex at the single connection of the connector 140 with the technology clip periphery wall 130. The connectors 140 may be plastic springs. In FIG. 7, the technology clip shell 120 is shown as cross-sectioned to show the attachment of the technology clip 100 about the tag 10, also shown cross-sectioned. The connectors 140 attach about the security tag periphery wall 30 at the security tag periphery wall connection with the security tag lower periphery wall 32, to secure the technology clip 100 over and onto the tag 10.

As shown in FIG. 5, in the preferred embodiment, the housing 20 of the security tag 10 may include a security tag embankment 24 sloping generally transverse to the diameter of the security tag 10 crossing from the circumference of the tag 10 about the security tag periphery 14. The base diameter of the security tag embankment 24 may be less than the diameter between the security tag periphery wall 30. A security tag plateau 22 is located at the top of and surrounded by the security tag embankment 24 which includes the plunger cavity 12 which may be located central on the security tag plateau 22. When the technology clip 100 is fit over the security tag 10, a portion of the security tag embankment 24 may fit into the technology clip shell 120 and through the technology clip hollow 112. The top edge of the security tag embankment 24, surrounding the security tag plateau 22, may rest flush with the technology clip lip 122 located around the technology clip hollow 112. In other embodiments, the plunger cavity 12 on the surface of the tag 10 may be located above or below the technology clip lip 122 when the technology clip 100 is secured about the security hard tag 10.

With the technology clip 100 secured over and about the security tag 10, the pin 54 may be inserted into the plunger cavity 12. Force is applied to the locking pin head 52 so that the pin 54 is locked in place with the pin 54 locked in the lock component 40 in the tag 10. The bottom side of the locking pin head 52 is placed on top of the security tag plateau 22 and over top the technology clip lip 122 so that the locking pin head 52 may act as a deterrent from removal of the technology clip 100 with the locking pin 50 attached to the security hard tag 10, Thus, the technology clip 100 is pinned between the locking pin head 52 and tag 10. In other embodiments, the locking pin head 52 may or may not secure the technology clip 100 to the security hard tag 10 when the locking pin 50 is locked to the security hard tag 10. This may be based on the size of the technology clip hollow 112. In some embodiments, the pin head 52 may be larger in diameter to cover over more of the technology clip 100 about the hollow 112 and may be larger than the diameter of the hollow 112. In other embodiments, the locking pin head 52 may be smaller in diameter than the hollow 112.

A fabric section of a garment or other portion of an article of merchandise may be placed between the technology clip 100 and tag 10 before the technology clip 100 is placed over the security hard tag 10, such that the garment is secured between a portion of the technology clip periphery wall 130 and security tag periphery wall 30, before the pin 54 is inserted through the garment and into the plunger cavity 12 of the tag 10, extending through the hollow 112 of the technology clip 100. Alternatively, garment or other portions of merchandise may be placed over the security tag plateau 22 and over the technology clip housing outer surface 121 after the technology clip 100 is secured over the tag 10, and before the pin 54 is inserted through the merchandise into the plunger cavity 12. In both examples, the locking pin head 52 may secure the merchandise to the security hard tag 10 and/or technology clip 100.

In other embodiments, the technology clip 100 may be secured about the tag 10 at other locations. For example the technology clip 100 may be affixed to the security hard tag 10 in a location that does not come between the connections of the locking pin 50 with the security hard tag 10. In other embodiments, the technology clip 100 may be secured with means other than or a means in combination with the connectors 140. For example, the technology clip 100 may simply be adhered to the surface of the security hard tag 10. The technology clip 100 may be connected to the locking pin head 52. In other embodiments, the locking pin 50 in combination with the technology clip 100 may together be secured to the tag 10 as the pin 54 is locked into the plunger cavity 12. In other embodiments, multiple technology clips may be attached to the security hard tag 10. For example, a second and similar technology clip to the clip 100 shown in the preferred embodiment may be attached over a first technology clip as shown in FIG. 5 through 7. A locking in 50 having a longer pin than that shown in the preferred embodiment may be required so as to extend into the plunger cavity 12 when passing through multiple technology clip hollows 112 of multiple technology clips 100 aligned over top of one another. In other embodiments, the security tag 10 may be attached to the technology clip 100 to secure the security tag 10 and technology clip 100 to each other. In this embodiment, the security tag 10 may use connectors 140.

The technology clip 100 may be removed and replaced with as different technology clip, having another technology feature, for use with the tag 10 for other desired security reasons. If as technology clip fails or doesn't work, it may be replaced with a new or functioning technology clip having the same or different technology element. The technology clip 100 serves as a low cost solution than having to design and manufacture a security hard tag 10 featuring two or more different technologies contained within. The capability to swap out one technology clip 100 for another for application to a security tag 10 provides a retailer or product manufacturer with choice and flexibility in what type of technologies to supplement the tag 10 with, lithe retailer or manufacturer decides to incorporate as certain technology on all their tags, they may simply swap out the old technology clip for a new technology clip incorporating the technology they desire, without having to purchase all new tags. The technology clip 100 may be detached via the connectors 140 and Idled away from the tag 10. In some embodiments, if the pin head 52 is larger in diameter than the technology clip hollow 112, then the locking pin 50 will first need to be removed from the tag 10. In other embodiments, the technology clip 100 may be removed regardless of whether the locking pin 50 is locked into the security hard tag 10, as for example when the pinhead 52 is smaller in diameter than the technology clip hollow 112. In other embodiments, the technology element, located within the technology clip shell 120 of the technology clip 100, may be swapped out for another technology element.

Although this disclosure has been described with reference to exemplary embodiments, it is not limited thereto. Those skilled in the art will appreciate that numerous changes and modifications ma be made to the preferred embodiments and that such changes and modifications may be made without departing from the true spirit of this disclosure. It is therefore intended that the appended claims be construed to cover all such equivalent variations as fall within the true spirit and scope of this disclosure.

What is claimed is:

1. An apparatus comprising:
   a security tag;
   a security tag locking pin;
   a clip, separate and independent from the security tag, wherein the clip comprises one or more connectors and a hollow, the one or more connectors being configured to attach the clip to the security tag and the hollow being configured to provide an accessway for the security tag locking pin to lock into the security tag to secure merchandise between the security tag and a head of the locking pin; and
   at least one technology element to provide enhancement to the security tag and wherein the at least one technology element is located within or about the clip.

2. The apparatus of claim 1 wherein the at least one technology element is selected from one of an acousto-magnetic element, a radio frequency element, an electro-magnetic element, a radio frequency identification element, or a benefit denial element.

3. The apparatus of claim 2, wherein the clip further comprises an internal ceiling extending from around the hollow to a periphery wall of the clip, wherein the periphery wall extends transverse from the surface of the internal ceiling along the periphery of the clip, and wherein the internal ceiling is opposite an outer surface of the clip.

4. The apparatus of claim 3, wherein the internal ceiling is concealed when the clip is attached to the security tag.

5. The apparatus of claim 4, wherein the at least one technology element is located on the internal ceiling.

6. The apparatus of claim 5, wherein the at least one technology element is adhered to the internal ceiling.

7. The apparatus of claim 6, wherein the at least one technology element is located around the hollow.

8. The apparatus of claim 7, wherein when the at least one technology element is a radio frequency identification element, the radio frequency identification element is formed as a radio frequency identification inlay comprising an antenna electrically connected to a radio frequency identification chip, wherein the antenna comprises a dipole and a loop connected by a neck, and wherein the dipole, loop, and neck are optimized to match impedance of the radio frequency identification chip.

9. The apparatus of claim 8, wherein the loop and the dipole are designed with curvatures to form the antenna around the hollow and to fit the antenna within the periphery wall and about the internal ceiling.

10. The apparatus of claim 3, wherein the diameter of the hollow is large enough to allow for a portion of the security tag to pass through the accessway of the hollow before the locking pin locks into the security tag.

11. The apparatus of claim 10, wherein the portion of the security tag passing through the accessway comprises:
 a security tag embankment rising from a security tag housing and in a generally transverse direction from the diameter of the security tag between the circumference of the security tag as surrounded by a security tag periphery wall and wherein the security tag is generally round;
 a security tag plateau wherein the security tag embankment rises to and surrounds the circumference of the security tag plateau; and
 a plunger cavity located central on the security tag plateau wherein the locking pin enters the plunger cavity to lock the locking pin into the security tag.

12. The apparatus of claim 11, wherein the one or more connectors are located about the periphery wall and connect about the security tag periphery wall when the clip is attached to the security tag.

13. The apparatus of claim 1, wherein the diameter of the hollow is smaller than the diameter of a locking pin head of the locking pin so that when the locking pin is locked into the security tag the technology clip is pinned between the locking pin head and the security tag, and wherein the locking pin head is located on the opposite end of the locking pin that is locked into the security tag.

14. An apparatus for a security tag, comprising:
 a shell, comprising:
  one or more connectors configured to attach the apparatus to the security tag;
  a hollow configured to provide an accessway for a security tag locking pin to lock into the security tag to secure merchandise between the security tag and a head of the locking pin, wherein the diameter of the hollow is large enough to allow for a portion of the security tag to pass through the accessway of the hollow before the locking pin locks into the security tag, wherein the portion of the security tag passing through the accessway comprises:
   (1) a security tag embankment rising from a security tag housing and in a generally transverse direction from the diameter of the security tag between the circumference of the security tag as surrounded by a security tag periphery wall and wherein the security tag is generally round;
   (2) a security tag plateau wherein the security tag embankment rises to and surrounds the circumference of the security tag plateau; and
   (3) a plunger cavity located central on the security tag plateau wherein the locking pin enters the plunger cavity to lock the locking pin into the security tag;
  an internal ceiling extending from around the hollow to a periphery wall of the shell, wherein the periphery wall extends transverse from the surface of the internal ceiling along the periphery of the apparatus, and wherein the internal ceiling is opposite an outer surface of the shell; and
 at least one technology element located within or about the shell, wherein the at least one technology element is selected from one of an acousto-magnetic element, a radio frequency element, an electro-magnetic element, a radio frequency identification element, or a benefit denial element, and the at least one technology element provides enhancement to the security tag.

15. The apparatus of claim 14, wherein the internal ceiling is concealed when the apparatus is attached to the security tag.

16. The apparatus of claim 14, wherein the at least one technology element is located on the internal ceiling.

17. The apparatus of claim 14, wherein the at least one technology element is adhered to the internal ceiling.

18. The apparatus of claim 14, wherein the at least one technology element is located around the hollow.

* * * * *